April 24, 1956     H. J. KUHN     2,742,732
FISH TANK AERATOR
Filed Nov. 5, 1952
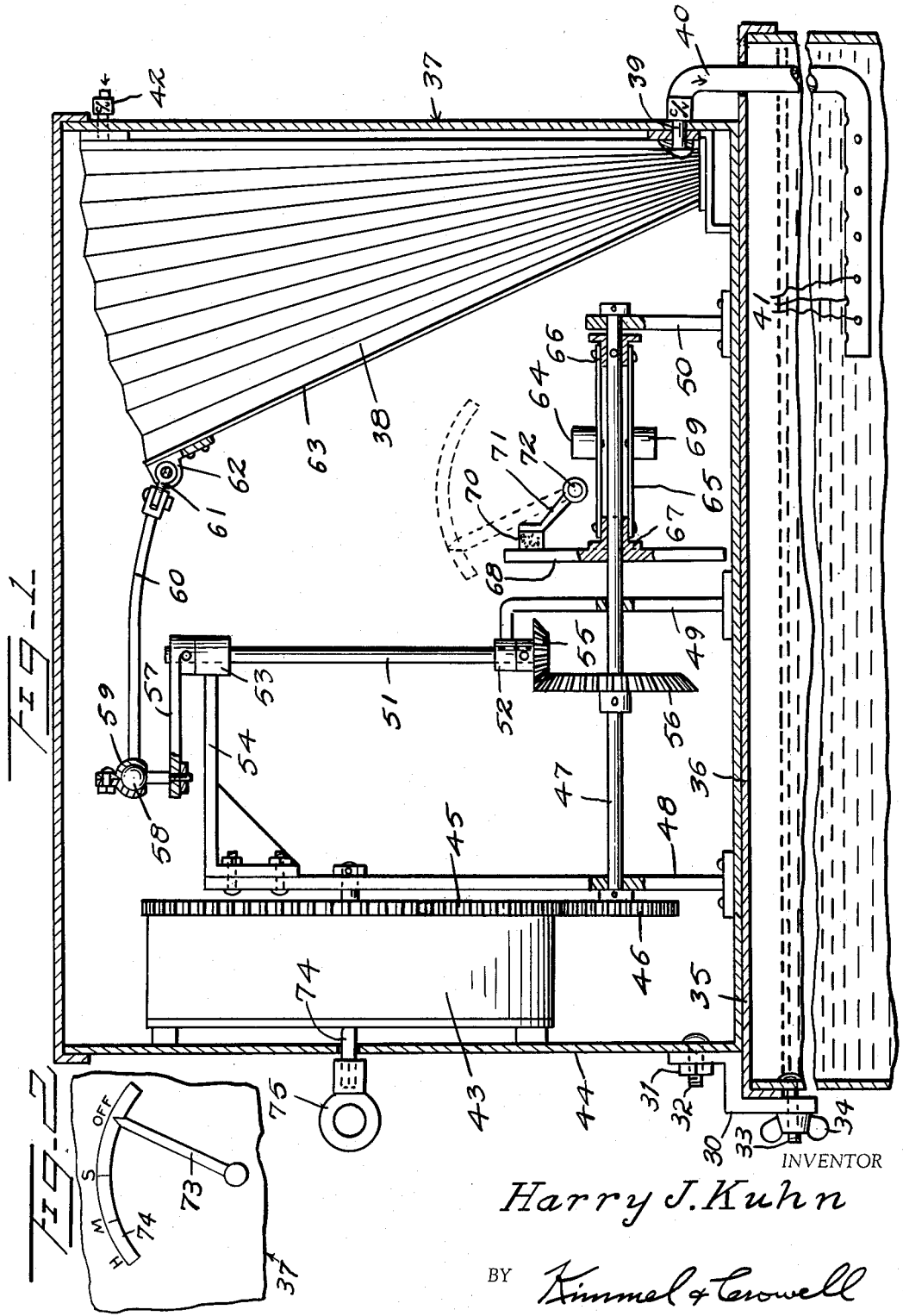
INVENTOR
*Harry J. Kuhn*
BY *Kimmel & Crowell*
ATTORNEYS

United States Patent Office 2,742,732
Patented Apr. 24, 1956

2,742,732
FISH TANK AERATOR

Harry J. Kuhn, Middletown, N. Y.

Application November 5, 1952, Serial No. 318,847

1 Claim. (Cl. 43—57)

This invention relates to an improved means for aerating a fish pail or tank.

An object of this invention is to provide an improved aerating means for a fish pail or tank embodying an air pump and a spring motor for operating the pump.

This invention contemplates the provision of a bellows-type pump which is operated from a spring motor in order to supply air to a bait pail, tank or other receptable.

A further object of this invention is to provide an aerating means of this type which is of simple construction and can be readily mounted on a bait pail or other container.

With the above and other objects in view, my invention consists in the arrangement, combination and details of construction disclosed in the drawings and specification, and then more particularly pointed out in the appended claim.

In the drawings:

Figure 1 is a vertical section of one form of this invention,

Figure 2 is a fragmentary side elevation of the regulator for the structure shown in Figure 1.

Referring to the structure shown in Figures 1 and 2, the numeral 35 designates generally a tank or fish pail having a top wall or cover 36. A housing 37 is detachably secured on the top wall 36 by means of one or more brackets 30. As is seen in Figure 1, one end of the bracket 30 illustrated therein is fixedly secured to the lower end of the housing 37 by the nut 31 and bolt 32, while the other end thereof is releasably secured to the upper end of the tank 35 by bolt 33 and wing nut 34. The housing 37 has mounted therein a bellows-type pump 38. The pump 38 includes an exhaust 39 with which an exhaust tube 40 is connected, and the tube 40 is extended downwardly into the receptacle or pail 35.

Tube 40 may be provided, as shown in Figure 1, with a plurality of openings 41 through which the air may be discharged into the water which is disposed in the receptacle 35. The pump 38 includes a check valve 42 adjacent the upper end thereof, which is an inwardly opening and outwardly closing check valve. Bellows 38 is operated from a spring motor 43 which is secured to a side wall 44 of the housing 37.

The motor 43 includes a spur driving gear 45 which meshes with a second gear 46 carried by a horizontal power take-off shaft 47. The shaft 47 is journalled in bearings 48, 49, and 50. A vertically disposed crank-shaft 51 is journalled at its lower end in a bearing 52 and is journalled at its upper end in a bearing 53 carried by a bracket 54. The lower end of the crankshaft 51 has secured thereto a bevelled gear 55 meshing with a bevelled third gear 56 mounted on horizontal shaft 47, the crankshaft 51 being positioned at right angles with respect to the horizontal shaft 47.

Crank arm 57 is secured to the upper end of shaft 51 and crank arm 57 has secured to the outer end portion thereof a spherical member 58 which engages in a socket 59 carried by a link 60. Link 60 extends to the bellows 38 and is connected to a fitting 61 which is carried rockably by a pair of ears 62 secured to the inner wall 63 of bellows 38.

The rotation of shaft 47 is regulated by means of a governor generally indicated at 64. The governor 64 includes a pair of spring bars 65 secured at one end to a collar 66 which is fixed to shaft 47. The opposite ends of the spring bars 65 are secured to the hub 67 of a braking disc 68. Disc 68 is loose on shaft 47 and may move lengthwise of shaft 47 as springs 65 are flexed outwardly by rotation of shaft 47 and outward movement of springs 65 under the action of weights 69 which are fixed to the spring members 65.

A fiber brake member 70 is carried by a crank or lever 71 which is fixed to a regulating shaft 72 and shaft 72 has secured to the outer end thereof a pointer 73, Fig. 2, which is movable across an arcuate indicating strip 74 fixed to the outer side of the housing 37.

Spring motor 43 includes a shaft 74 extending through the side wall 44 and a key 75 is mounted on shaft 74.

In the use and operation of the aerator shown in Figures 1 and 2, when motor 43 is wound up, regulating member 73 may be moved as indicated in Figure 2, so as to permit movement of disc 68 to the right through the force exerted thereon by the springs 65, as viewed in Figure 1. The spring motor 43 now drives the gear 45 which in turn drives gear 46. The gear 46 being secured on shaft 47 effects its rotation. Rotation of shaft 47 drives the gears 56 and 55, and the latter gear causes the shaft 51 to rotate. Crank arm 57, being connected to shaft 51, is also rotated and through its connection with the link 60 causes the latter to move toward and away from the bellows 38. Since the link 60 is connected with the bellows, this movement effects alternate contraction and expansion of bellows 38 so that air will be forced into the water in receptacle 35.

The structure hereinbefore described is of a character such that it may be readily mounted on a portable receptacle such as a bait pail or the like so that live bait in the pail will not die due to lack of air or oxygen in the water.

I do not mean to confine myself to the exact details of construction herein disclosed, but claim all variations falling within the purview of the appended claim.

What I claim is:

In combination with a bait pail having an open upper end, a closure member for said open end, a housing supported on said closure member, means for detachably securing said housing to said pail, a motor within said housing, said motor having a gear fixedly secured to the drive shaft thereof, a power take-off shaft supported in said housing, said power take-off shaft having a second gear fixedly secured to an end thereof and meshing with said first gear, centrifugally operated governing means mounted on the other end of said power take-off shaft, a third gear mounted on said power take-off shaft intermediate the ends thereof, a second shaft at right angles to said power take-off shaft, bracket means supporting said second shaft for rotation thereon, a fourth gear mounted on one end of said second shaft and meshing with said third gear, bellows means mounted within said housing, cranks means connected between said last-named shaft and said bellows means for operating said bellows means, a tubular conduit connected with the discharge end of said bellows means and having an end thereof extending within said pail, and a check valve connected in said tubular conduit.

(References on following page)

References Cited in the file of this patent

UNITED STATES PATENTS

| | | |
|---|---|---|
| 594,742 | Hutter | Nov. 30, 1897 |
| 844,724 | Herrmann | Feb. 19, 1907 |
| 875,835 | Mueller | Jan. 7, 1908 |
| 907,826 | Longfellow | Dec. 29, 1908 |
| 927,504 | Dennison | July 13, 1909 |
| 1,073,353 | Kraning | Sept. 16, 1913 |
| 1,177,898 | Rimmer | Apr. 4, 1916 |
| 1,229,308 | Morgan | June 12, 1917 |
| 2,560,672 | Volenec | July 17, 1951 |
| 2,601,198 | Willson | June 17, 1952 |

FOREIGN PATENTS

| | | |
|---|---|---|
| 1,152 | Great Britain | 1884 |